US007870402B2

(12) United States Patent
Hirezaki et al.

(10) Patent No.: US 7,870,402 B2
(45) Date of Patent: *Jan. 11, 2011

(54) CONTROL METHOD OF STORAGE SYSTEM, STORAGE SYSTEM, AND STORAGE APPARATUS

(75) Inventors: Katsumi Hirezaki, Odwara (JP); Koji Nagata, Oi (JP); Yosuke Murakami, Oiso (JP)

(73) Assignee: Hitachi, Ltd., Tokyo (JP)

( * ) Notice: Subject to any disclaimer, the term of this patent is extended or adjusted under 35 U.S.C. 154(b) by 678 days.

This patent is subject to a terminal disclaimer.

(21) Appl. No.: 11/775,132

(22) Filed: Jul. 9, 2007

(65) Prior Publication Data
US 2008/0016382 A1    Jan. 17, 2008

Related U.S. Application Data

(63) Continuation of application No. 11/352,088, filed on Feb. 9, 2006, now Pat. No. 7,246,248, which is a continuation of application No. 10/684,060, filed on Oct. 10, 2003, now Pat. No. 7,032,118.

(30) Foreign Application Priority Data
May 7, 2003    (JP) ............................. 2003-129526

(51) Int. Cl.
G06F 1/26    (2006.01)

(52) U.S. Cl. .................. 713/310; 713/330; 711/111; 365/227

(58) Field of Classification Search ................. 713/310, 713/340, 330; 711/111; 365/227, 228
See application file for complete search history.

(56) References Cited

U.S. PATENT DOCUMENTS

| 5,410,713 | A | 4/1995 | White et al. |
| 5,652,892 | A | 7/1997 | Ugajin |
| 5,745,391 | A | 4/1998 | Topor |
| 5,799,196 | A | 8/1998 | Flannery |
| 5,835,780 | A | 11/1998 | Osaki et al. |
| 5,938,771 | A | 8/1999 | Williams et al. |
| 6,160,873 | A | 12/2000 | Truong et al. |
| 6,389,546 | B1 | 5/2002 | Kano et al. |
| 6,408,395 | B1 | 6/2002 | Sugahara |
| 6,415,387 | B1 | 7/2002 | Aguilar et al. |
| 6,523,089 | B2 * | 2/2003 | Tsern et al. ................. 711/118 |

(Continued)

FOREIGN PATENT DOCUMENTS

JP    07-115428 A    5/1995

(Continued)

OTHER PUBLICATIONS

Japan Patent Office (JPO) office action for JPO patent application JP2003-129526 (Mar. 17, 2009).

*Primary Examiner*—Thuan N Du
(74) *Attorney, Agent, or Firm*—Townsend and Townsend and Crew LLP

(57) ABSTRACT

When power to a storage device is turned on and the storage device can accept a data input and output request being transmitted from an information processing device, the storage device transmits a power-on request for turning on power to the information processing device. The storage device, when it accepts a stop-power instruction, transmits a stop-power request for stopping power to the information processing device.

4 Claims, 6 Drawing Sheets

U.S. PATENT DOCUMENTS

| | | |
|---|---|---|
| 7,321,976 B2 | 1/2008 | Hasegawa |
| 2002/0087899 A1 | 7/2002 | Kano et al. |
| 2002/0144057 A1* | 10/2002 | Li et al. ................. 711/112 |
| 2004/0068672 A1 | 4/2004 | Fisk et al. |
| 2004/0111596 A1 | 6/2004 | Rawson |

FOREIGN PATENT DOCUMENTS

| | | |
|---|---|---|
| JP | 11-212682 A | 8/1999 |
| JP | 2002-006998 A | 1/2002 |
| JP | 2002-135974 A | 5/2002 |

* cited by examiner

| INFORMATION PROCESSING DEVICE | IP ADDRESS | POWER-ON REPORT | POWER-STOP REPORT |
|---|---|---|---|
| #1 | 192.168.0.10 | ○ | ○ |
| #2 | 192.168.0.11 | ○ | × |
| ⋮ | ⋮ | ⋮ | ⋮ |

CONTROL METHOD OF STORAGE SYSTEM, STORAGE SYSTEM, AND STORAGE APPARATUS

CROSS-REFERENCE TO RELATED APPLICATION

The present application is a Continuation Application of U.S. application Ser. No. 11/352,088, filed Feb. 9, 2006, which is a Continuation Application of U.S. application Ser. No. 10/684,060, filed Oct. 10, 2003, which is related to and claims priority from Japanese Patent Application No. 2003-129526, filed on May 7, 2003, all of which are incorporated by reference herein in their entirety for all purposes.

BACKGROUND OF THE INVENTION

1. Field of the Invention

This invention relates to a method for control of a storage system, a storage system, and a storage apparatus.

2. Description of the Related Art

Technology for controlling a power supply of an information processing device and a power supply of an interlocked peripheral device that promotes the efficiency of both operational management of a system and automation, reduces the system's electric power consumption is disclosed, for example, by JP-A-2002-6998.

In a storage system having an information processing device and a storage device for accepting a data input and output request from an information processing device, normally, the information processing device and the storage device have independent power switches. When a power supply is turned on and operation of the storage system is started, the respective power switches which are located in the information processing device and the storage device must be turned on. In some systems, however, the order in which they are turned on is important. If turned on in the wrong order, various problems occur such that the storage device cannot accept the data input and output request being transmitted from the information processing device. If the storage system operation has to be stopped because the order of stopping the power is incorrect, it is of concern that data will be destroyed, file systems will mismatch, and other similar problems will occur.

The present invention provides a method of controlling a storage system, the storage system itself, and a storage apparatus that mitigates these problems.

BRIEF SUMMARY OF THE INVENTION

One aspect of this invention to accomplish the above-described aim is provision of a control method for a storage system. The system includes an information processing device having a first power supply which activates a function for transmitting a data input and output request; and a storage device connected to the information processing device to communicate with it. The storage device includes a second power supply that activates a function for accepting the data input and output request transmitted from the information processing device. As a result, when the second power supply is turned on and the storage device enters into a state where it can accept the data input and output request transmitted from the information processing device, the storage device transmits a power-on request for turning on the first power supply to the information processing device.

The invention also provides method of controlling a storage system that includes an information processing device having a first power supply that activates a function for transmitting a data input and output request. The storage device is connected to the information processing device to be able to communicate with it, and the storage device includes a second power supply that activates a function for accepting the data input and output request transmitted from the information processing device. When the storage device accepts a stop instruction of the second power supply, the storage device also transmits a power-stop request for stopping the first power supply to the information processing device.

Typically, the information processing device, for example, can be a personal computer, a work station, a mainframe computer, etc. The storage device, for example, can include a disk array device, a semiconductor storage device, or other well known apparatus. In one embodiment, the information processing device and the storage device, for example, include a storage area network (SAN), a Local Area Network (LAN), etc., and are connected to communicate with each other. An instruction for stopping the second power supply that the storage device accepts is executed when a user or an operator turns off the power supply of the storage device.

As described above, in this storage system, when the power supply of the storage device is turned on, the storage device enters a state where it can accept the data input and output requests transmitted from the information processing device. After that, the power supply of the information processing device is turned on enabling control of the power supply of the storage device and the power supply of the information processing device in an interlocked manner. When the storage device accepts the stop instruction, the power supply of the information processing device is stopped, and then the power supply of the storage device is stopped. Other problems that this application discloses and methods for solving them will be shown by embodiments and drawings of the invention.

BRIEF DESCRIPTION OF THE DRAWINGS

The invention, together with further advantages thereof, may be best be understood by reference to the following description taken in conjunction with the accompanying drawings in which.

DETAILED DESCRIPTION OF THE INVENTION

An embodiment of this invention is described in detail below with reference to the drawings.

===Example of the Entire Structure===

<Storage System>

Figure 1:
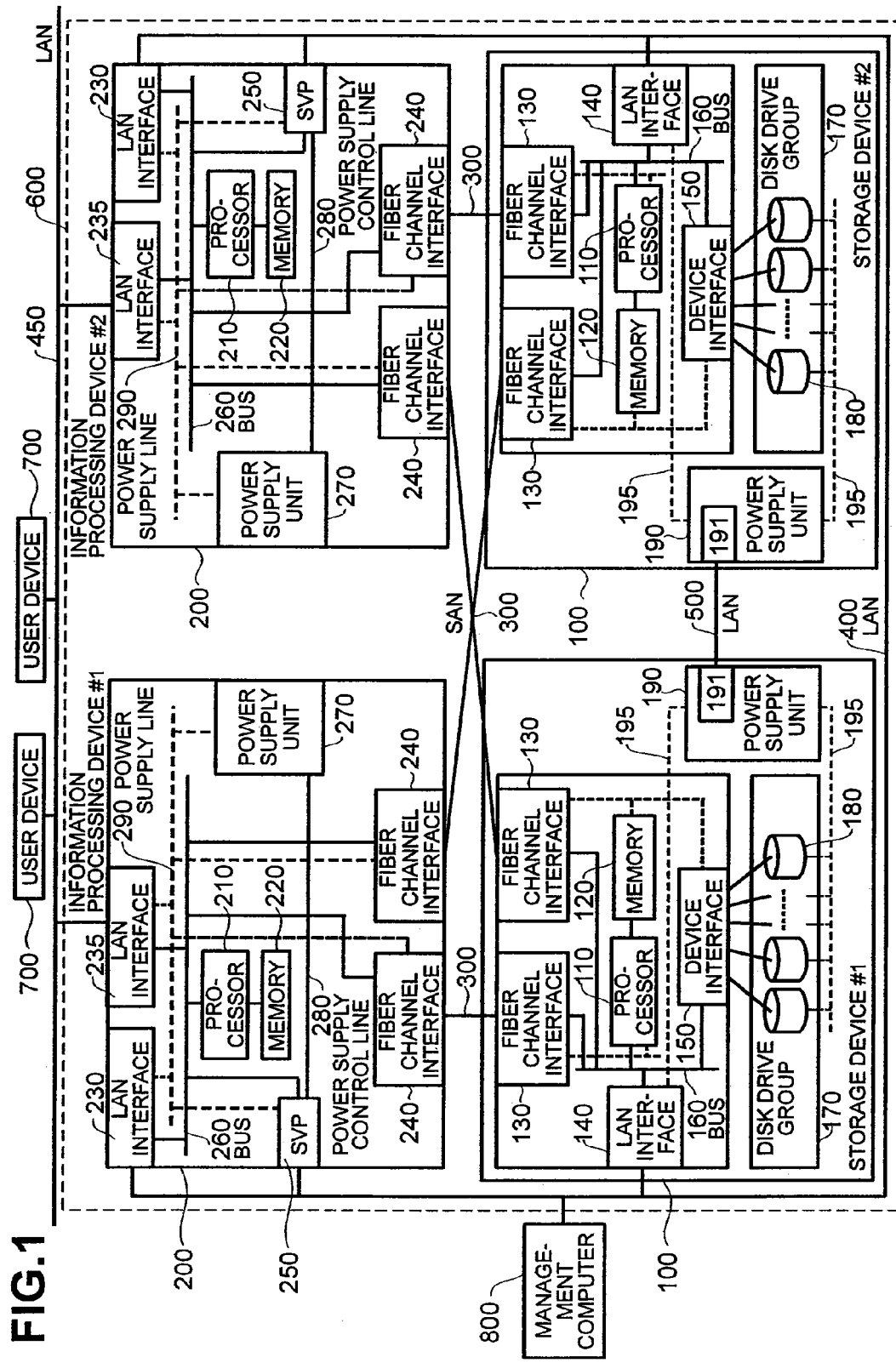
FIG. 1 is a block diagram of a hardware structure of a storage system relating to an embodiment of the invention.

FIG. 1 is a block diagram showing the hardware structure of the storage system 600. A user device 700 is connected to storage system 600 through LAN 450, and a management computer 800 is connected through LAN 400. User device 700 accesses information processing systems #1, #2 (200) of storage system 600, and, for example, consists of a personal computer, a work station, a mainframe computer. Management computer 800 carries out the operation and management of storage system 600, and is connected to two devices located therein—storage device 100 and information processing device 200—through LAN 400. Management computer 800 does not have to be connected by communication means such as LAN 400, and may be connected by a communication media such as a SCSI bus (Small Computer Systems Interface), a different bus, peer to peer, or other connection, LAN 400 and LAN 450 may be LANs that are independent from each other, or may be connected in such a manner that they can communicate with each other and be configured by the same LAN.

Storage system 600 is configured by including storage device 100, and information processing device 200. Storage system 600 operates, for example, in a system center, data center or the like. In addition, in FIG. 1, storage system 600 has two storage devices 100 and two information processing devices 200, but it is not limited to this exemplary configuration. Storage system 600 may have one or more storage devices 100 and one or more information processing devices 200.

Information processing device 200 is a computer that provides, for example, an automatic deposit and payment service for a bank, a home page browsing service for the Internet, etc. Storage device 100 functions as a device for storing data handled by information processing device 200. Information processing device 200 and storage device 100 are connected through Storage Area Network (SAN) 300. SAN 300 is a network for connecting information processing device 200 and storage device 100 in such a manner that they can communicate, for example, using a fiber channel protocol. In this embodiment, information processing device 200 and storage device 100 are connected through Local Area Network (LAN) 400. LAN 400 is a network for connecting information processing device 200 and storage device 100 in such a manner that they can communicate with a protocol such as TCP/IP or other protocols.

<Information Processing Device>

Information processing device 200 is, for example, a personal computer, a work station, a mainframe computer, or the like. As shown in FIG. 1, information processing device 200 has a processor 210, a memory (e.g., ROM, RAM) 220, LAN interfaces 230, 235, a fiber channel interface 240, a host interface (SVP) 250, a bus 260, and a power supply unit 270. Processor 210 of information processing device 200 controls the information processing device 200, and effects various functions, typically by executing a program stored in memory 220.

The LAN interface 230 implements communication with storage device 100 and management computer 800. In addition, the LAN interface 235 carries out communication with user device 700. LAN interfaces 230, 235 are, for example, Network Interface Cards (NICs), and one connects information processing device 200 to LAN 400 and 450.

Fiber channel interface 240 is an interface carrying out communication with storage device 100. Fiber channel interface 240, for example, may be provided as a Host Bus Adaptor (HBA), and connects information processing device 200 to SAN 300. Thus, it is possible for information processing device 200 to transmit and receive data input and output commands to and from storage device 100. Communication carried out through SAN 300 between information processing device 200 and storage device 100 is generally carried out in accordance with the fiber channel protocol. A data access request of a block unit, for example, is transmitted from information processing device 200 to storage device 100 in accordance with the fiber channel protocol.

Information processing device 200 and storage device 100 may be connected through LAN 400, or may be directly connected. If they are connected through LAN 400, communication between them is carried out in accordance with, for example, a TCP/IP protocol. In this case, a data access request with designation of a file name is transmitted from information processing device 200 to storage device 100.

If information processing device 200 and storage device 100 are directly connected, communication between them may use a communication protocol such as FICON® (Fiber Connection), ESCON® (Enterprise System Connection, ACONARC® (Advanced Connection Architecture, FIBARC® (Fiber Connection Architecture) or other technologies. A block access request is transmitted from information processing device 200 to storage device 100 in accordance with the communication protocol. Bus 260 connects processor 210, memory 220, LAN interface 230, fiber channel interface 240 and SVP 250 in a manner such that they can communicate with each other.

Power supply unit 270 has a power supply that activates a function for transmitting the data input and output request in information processing device 200, a switch used by an operator to turn on power. Power supply unit 270, for example, can be an AC/DC power supply. Power supply unit 270 is connected to SVP 250 through a power supply control line 280. Power supply unit 270 supplies power to boards and units such as processor 210, LAN interfaces 230, 235, fiber channel interface 240, and SVP 250, as the result of a power-on request transmitted from SVP 250. In addition, power supply unit 270 cuts off power, which is supplied through a power supply line 290 to boards and units such as the processor 210, the LAN interfaces 230, 235, the fiber channel interface 240, and 250 on receipt of a power-stop request transmitted from SVP 250.

SVP 250, for example, comprises a processor, a memory and other conventional components. When SVP 250 is a computer, it may be designed as built into information processing device 200, or it may be externally located. SVP 250 is connected to storage device 100 through LAN 400. Further, SVP 250 is connected to power supply unit 270 through power supply control line 280. SVP 250 includes a function for transmitting the power-on request to power supply unit 270 when the power-on request for turning on the power of the information processing device 200 is received from storage device 100. SVP 250 also transmits the power-stop request to power supply unit 270 once the power-stop request for stopping power of the information processing device 200 is received from the storage device.

Figures 2, 3:
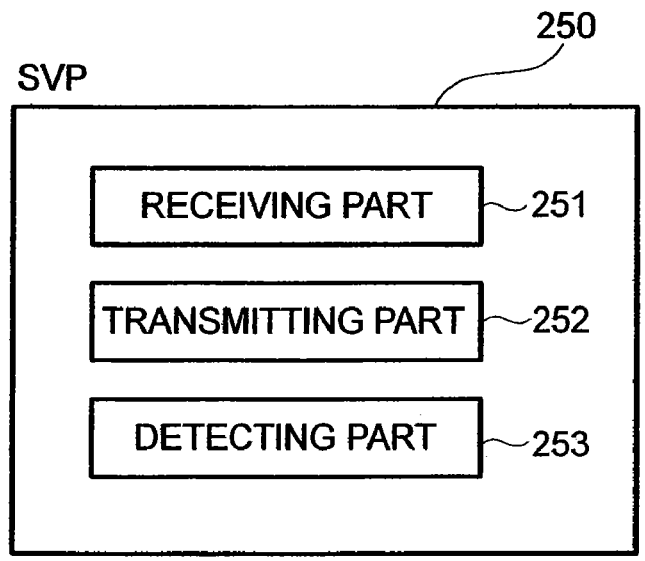
FIG. 2 is a block diagram showing a structure of an SVP.
FIG. 3 is a diagram of an information processing system management table.

FIG. 2 is a block diagram showing an exemplary structure of SVP 250 in the embodiment. In FIG. 2, SVP 250 has a receiving part 251, a transmitting part 252, and a detecting part 253. Receiving part 251 of SVP 250 has a function for receiving the power-on/power-stop requests from storage device 100 through LAN 400. In addition, receiving part 251 has a function for receiving information from processor 210 that activation of a function for transmitting the data input and output request in the information processing device has become possible.

Transmitting part 252 of SVP 250 has a function for transmitting the power-on/power-stop requests to power supply unit 270 through power supply control line 280.

Detecting part 253 of SVP 250 has a function for detecting that receiving part 251 received information from processor 210 that it has become possible to activate a function for transmitting the data input and output request in the information processing device. Detecting part 253 also has a function for detecting that the power of information processing device 200 was stopped.

Transmitting part 252 reports to storage device 100 through LAN 400 that power was turned on, when detecting part 253 detects that receiving part 251 received information from processor 210 that the function for transmitting the data input and output request in information processing device 200 can be activated. In addition, receiving part 252 reports to storage device 100 through LAN 400 that power was stopped when detecting part 253 detects that the power of the information processing device was turned off.

<Storage Device>

Storage device 100 is, for example, a disk array device, a semiconductor storage device, or other storage. In one embodiment, storage device 100 controls disk drive 180 in accordance with a command received from information processing device 200. For example, on receiving the input and output request of data transmitted from information processing device 200, input and output processing of data stored on disk drive 180 is carried out. The data is stored in a logic volume which is a storage area logically defined in a physical storage area on disk drive 180 of storage device 100. Various commands for managing storage device 100 are passed back and forth between that device and information processing device 200. Storage device 100 includes a processor 110, a memory (e.g., a shared memory, a cache memory or the like) 120, a fiber channel interface 130, a LAN interface 140, a device interface 150, a bus 160, a disk drive group 170, a power supply unit 190 and so on. Processor 110 of storage device 100 controls storage device 100, and effects various functions by executing a program stored in memory 120.

Fiber channel interface 130 enables communication with information processing device 200. Fiber channel interface 240 is, for example, HBA, and connects storage device 100 to SAN 300, thereby making it possible for storage device 100 to transmit and receive data input and output commands, as well as other data, to and from information processing device 200.

Bus 160 mutually connects the processor 110, memory 120, fiber channel interface 130, LAN interface 140, and device interface 150. Transmission and reception of data and commands among processor 110, memory 120, fiber channel interface 130, LAN interface 140, and device interface 150 are carried out through bus 160.

LAN interface 140 provides for communication between storage device 100 and management computer 800. LAN interface 140 is, for example, a NIC which connects storage device 100 to information processing device 200, and management computer 800, thereby making it possible for storage device 100 to transmit the power-on/power-stop requests to SVP 250 of information processing device 200 through LAN 400. In addition, transmission of the power-stop request may be carried out through LAN interface 230 of information processing device 200 and LAN 400, or may be carried out through fiber channel interface 240 of information processing device 200 and SAN 300.

Device interface 150 is for communication with disk drive 180, making it possible to read and write data in disk drive 180. Power supply unit 190 activates a function for accepting the data input and output request transmitted from information processing device 200, a switch by which an operator turns on the power, and other standard features. Power supply unit 190 may be, for example, an AC/DC power supply.

Power supply unit 190 supplies power through a power supply line 195 to boards and units such as processor 110, fiber channel interface 130, LAN interface 140, device interface 150, and disk drive 180 when it is detected that power was turned on by an operator. Power supply unit 190 also cuts off power supplied through power supply line 195 to boards and units such as processor 110, fiber channel interface 130, LAN interface 140, device interface 150, and disk drive 180 when a power-stop instruction from an operator is accepted. Power supply unit 190 includes a communication interface 191 for connecting to the power supply unit 190 of another storage device 100. Communication interfaces 191 are connected through LAN 500, while communication interface 191 is a LAN board, for example, which preferably includes Wake on LAN capability.

Power supply unit 190 transmits the power-on request to power supply unit 190 of another storage device 100 through LAN when it is detected that power was turned on by an operator. Power supply unit 190 also transmits the power-stop request to power supply unit 190 of another storage device 100 through LAN 500 when a power stop instruction from an operator is accepted. In addition, the system may be designed so that a specific storage device 100 transmits the power-on request to another storage device 100 through LAN 400.

When the power-on request is received, power supply unit 190 has a function for supplying power through a power supply line 195 to boards and units such as processor 110, fiber channel interface 130, LAN interface 140, device interface 150, and disk drive 180. It also enables initiating system activation sequence processing as will be described later. Power supply unit 190, once the power stop request is received, also has a function for initiating a system stop sequence processing, as also described below.

As described, by placing the communication interface 191 in power supply unit 190, it is possible to have such processing carried out that if an operator simply turns on the power of a specific storage device 100, the power of another storage device 100 is turned on. In addition, it is possible to have such processing carried out so that if an operator simply gives a power-stop instruction to a specific storage device 100, another storage device initiates the system sequence processing.

Storage device 100 has a function for transmitting the power-on request to SVP 250 of information processing device 200 through LAN 400, when the storage device power is turned on by an operator and storage device 100 enters into a state where it can accept the data input and output request transmitted from information processing device 200. Transmission of this power-on request may be carried out after storage device 100 enters a state where it can accept the data input and output request being transmitted from information processing device 200, or may be carried out right before it enters such a state.

Information processing device 200, which transmits the power-on request, may be the information processing device 200 that was registered in advance by an operator, or may be some or all of the information processing devices 200 that are connected through LAN 400. The information processing device 200 that was registered in storage device 100 can be set by an activity that an operator uses to operate management computer 800. In addition, the invention may be designed so that storage device 100 transmits the power-on request to an IP address of information processing device 200 with reference to an information processing device management table that was stored in memory 120 and disk drive 180 of storage device 100 by system activation sequence processing 2, which will be described later.

FIG. 3 shows one example of the information processing device management table. In column three of the table, a symbol (e.g., [O] or [X]) indicates whether there was a power on report. Likewise, in column four, a symbol (e.g., [O] or [X]) indicates whether there was a power-stop report.

Storage device 100 also has a function for transmitting the power-stop request for stopping the power of information processing device 200. The stop power request is sent directly to information processing device 200 after the power-stop instruction is received by storage device 100 from an operator. The information processing device 200 that transmits this power-stop request may be the information processing device 200 that was registered in advance by an operator, or may be the information processing device 200 to which an IP address stored in the information processing device management table is given.

<Disk Drive>

A disk drive may be configured through the use of a Redundant Array of Independent Disks (RAID) with a plurality of disk drives 180. Therefore, it is possible to provide a logic volume, which is provided to information processing device 200 with the plurality of disk drives 180, which are managed by a RAID. The disk drive 180 may be any of a variety, such as a hard disk device, a flexible disk device, a semiconductor storage device, or other known technology. Device interface 150 and disk drive 180 may be directly connected as shown in FIG. 1 or may be connected through a network.

<Management Computer>

Management computer 800 is for repairing and maintaining storage device 100 and information processing device 200, which are connected by LAN 400. The management computer is, for example, a personal computer, a work station, a mainframe computer, or the like. Management computer 800 has a processor and a memory. The processor of management computer 800 controls of the management computer and effects various functions by executing a program stored in memory. Using an activity by which an operator controls management computer 800, it is possible to carry out, for example, setting of a structure of the disk drive, management and setting of the logic volume (capacity management and capacity expansion/reduction), assignment of information processing device 200, setting of a cluster of storage device 100, setting of information processing device 200, setting of storage device 100, which information processing device 200 can access, etc, As for setting of the structure of the disk drive, it is possible to carry out, for example, expansion and reduction of the disk drive, changing the RAID structure (e.g., change from RAID1 to RAID5), and so on. Furthermore, from management computer 800, it is possible to confirm the operation state of storage device 100, specifying a failure site, and provide other control. These settings are made by an operator through the use of Web pages as a user interface, the Web pages being provided through a Web server operated by management computer 800. Management computer 800 may be built into storage device 100 or may be externally located.

There is no requirement for communication between storage device 100 and management computer 800 to be carried out by LAN 400, but they may be connected through a standard SCSI communication line, a bus line, a peer-to-peer configuration, or the like. Management computer 800 may be a computer that exclusively carries out repair and maintenance of storage device 100 and disk drive 180, or may be a widely used computer to which a repair and maintenance function was added.

===System Activation Sequence Processing===

Storage system 600 of the embodiment includes, as described above, information processing device 200 having a power supply that activates the function for transmitting the data input and output request; and storage device 100, which is connected to information processing device 200 through LAN 400 and SAN 300 in such a manner that the two devices can communicate with each other. The storage device includes a power supply that accepts the data input and output request transmitted from information processing device 200. In storage system 600 of the embodiment, when it is detected that power supply of the storage device 100 has been turned on by an operator, the system activation sequence processing is initiated. Through this processing, when storage device 100 enters a state where it can accept the data input and output request from information processing device 200, storage device 100 carries out an operation for transmitting the power-on request to information processing device 200.

In this way, it becomes possible to control the power supply of an information processing device 200 and the power supply of a peripheral device 100 so that they are interlocked. Moreover, since the power supply of information processing device 200 is to be turned on, after activating a program that initiates the function for accepting the data input and output request in storage device 100, problems such as glitch where the storage device cannot accept the data input and output request being transmitted from the information processing device are prevented. Next, the system activation sequence processing of storage system 600 is described.

<System Activation Sequence Processing 1>

Figure 4:
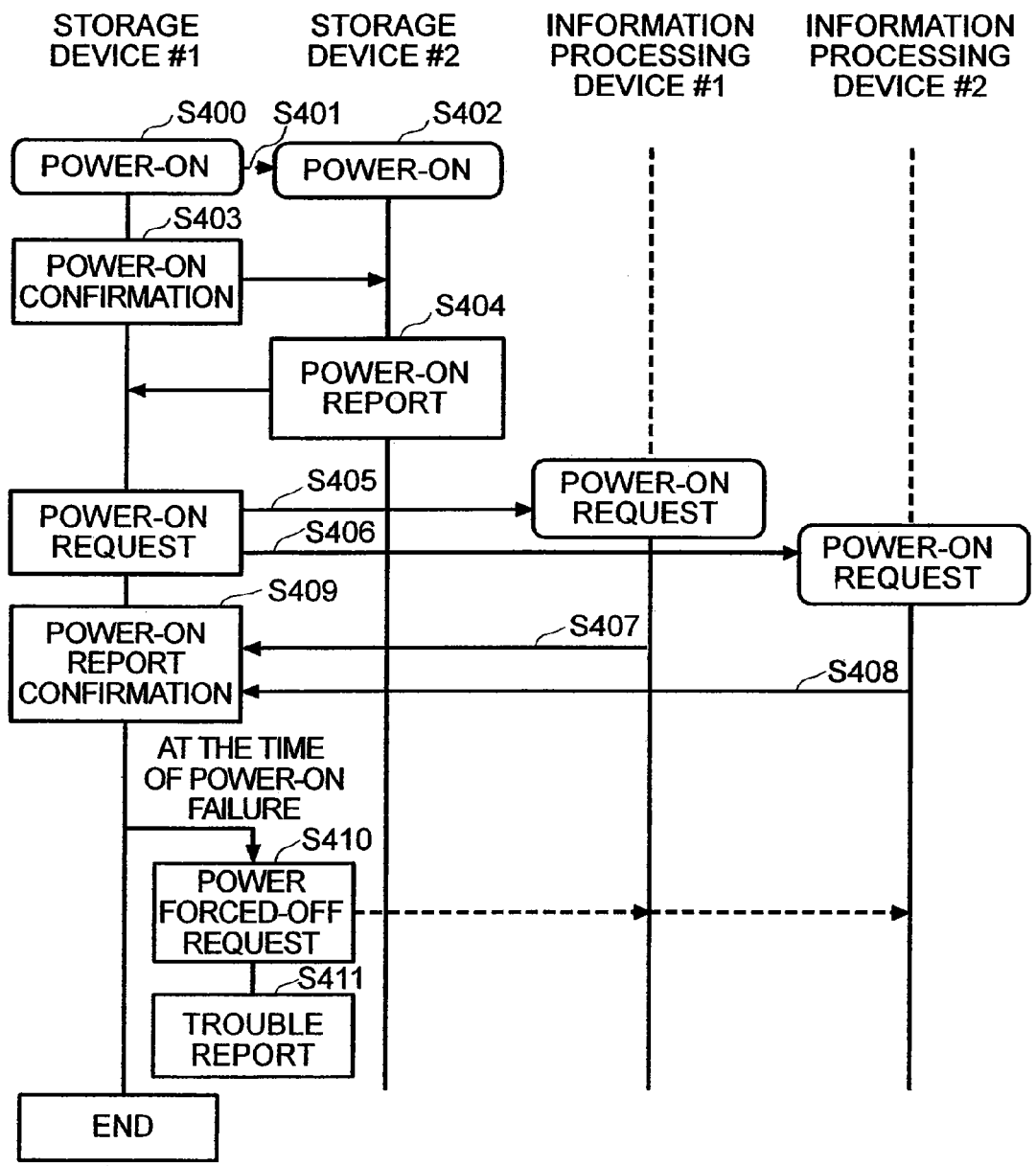
FIG. 4 is a flow chart illustrating a first system activation sequence process of the storage system.

FIG. 4 is a flow chart explaining the system activation sequence processing of storage system 600. As shown in this flow chart, when storage device #1 (100) detects that power was turned on (Power ON) by a user, the system activation sequence processing is initiated. When power supply unit 190 of the storage device #1 (100), detects that power was turned on, supplies power to processor 110, fiber channel interface 130, LAN interface 140, and device interface 150 through power supply line 195, and transmits the power-on request to power supply unit 190 of the storage device #2 (100) (S401) (see FIG. 1).

When power supply unit 190 of storage device #2 (100) receives the power-on request, power supply unit 190 turns the power on (Power ON; S402), and supplies power to processor 110, fiber channel interface 130, LAN interface 140, and device interface 150 through power supply line 195. When power is supplied to processor 110 of storage device 100, a program is activated that initiates the function for accepting the data input and output request stored in memory 120, and disk drive 180, it enters into a state where it can accept the data input and output request being transmitted from information processing device 200.

Although it was previously described that power supply unit 190 of storage device #1 (100) transmits the power-on request to power supply unit 190 of storage device #2 (100) and turns on the power of storage device #2 (100), the invention may be configured so that an operator turns on the power of storage device #2 (100).

Next, storage device #1 (100) inquires of storage device #2 (100) whether power was turned on (S403). As an alternative, storage device #2 (100), when it can accept the data input and output request being transmitted from the information processing device 200, sends storage device #1 (100) a report that power was turned on (S404).

Storage device #1 (100), when the report that power was turned on from the storage device #2 (100) is received, carries out the power-on request to information processing device 200 (S405, S406). For example, storage device #1 (100) prepares an activation use special packet (Power-On Request) for having the power of information processing device 200 turned on, and transmits it to SVP 250 of information processing devices #1, #2 (200), which were registered in advance by an operator through LAN 400. In addition, in this embodiment, since SVP 250 makes the power-on request from storage device 100 possible to receive, there is a slight current flowing through SVP 250.

When the receiving part 251 of SVP 250 receives the activation use special packet from storage #1 (100) through LAN 400, transmitting part 252 of SVP 250 transmits the power-on request to turn on the power in power supply unit 270 of information processing device 200 through power supply control line 280. Power supply unit 270, having received the power-on request, turns on the power, and supplies power to each board and unit through power supply line 290. Processor 210, with power supplied thereto, activates a program that initiates the function for transmitting the data input and output request.

Once processor 210 has confirmed that it is in a state where the data input and output request transmitted from information processing device 200 can be sent, the processor notifies SVP 250 of that information. When detecting part 253 of SVP 250 determines that power was turned on, detecting part 253 sends that information to storage device #1 (100) through LAN 400 (Power-On Report) (S407, S408). In addition, it is described above that, after storage device #1 (100) transmitted the activation use special packet to information processing devices #1, #2 (200), storage device #1 (100) waited for the power-on report from information processing devices #1, #2 (200), but the invention may be designed so that after storage device #1 (100) transmits the activation use special packet to information processing devices #1, #2 (200), it queries information processing devices #1, #2 (200) periodically at determined intervals regarding whether the program was activated that initiates the function for transmitting the data input and output request.

Once storage device #1 (100) confirms that it received the reports that power was turned on from all information processing devices 200 to which the power-on request was transmitted (S409), storage device #1 (100) has the system activation sequence processing terminated. In addition, the invention may be designed so that information (e.g., IP address, etc.) of the storage device 100 that information processing device 200 can access is transmitted together with the activation use special packet that the storage device transmits. In this way, a complicated operation is eliminated that an operator controlling management computer 800 would have to set and register in advance for storage device 100 in conjunction with each information processing device 200 that might access each information processing device 200.

Storage device #1 (100, after transmitting the activation use special packet, cannot receive the power-on report from SVP 250 of information processing device 200, even if a given period of time has passed. Storage device #1 (100) transmits a special packet to SVP 250 to have the power to information processing device 200 cut off (Power-off request) (S410). In addition, in this case, the system may be designed so that the storage device #1 (100) cuts off its communication connection with information processing device 200. An alternative design is to transmit a reset use special packet for re-activating information processing device 200 (Reset Request), without immediately transmitting the special packet for having power cut off.

Storage device #1 (100), after transmitting to SVP 250 of information processing device 200 the special packet for having power cut off (S410), reports to information processing device 200, which is properly activated, user device 700, management computer 800, and so on, that a glitch has occurred in information processing device 200 (S411). With this report, a user, an operator can know there is some sort of problem in information processing device 200.

<System Activation Sequence Processing 2>

Figure 5:
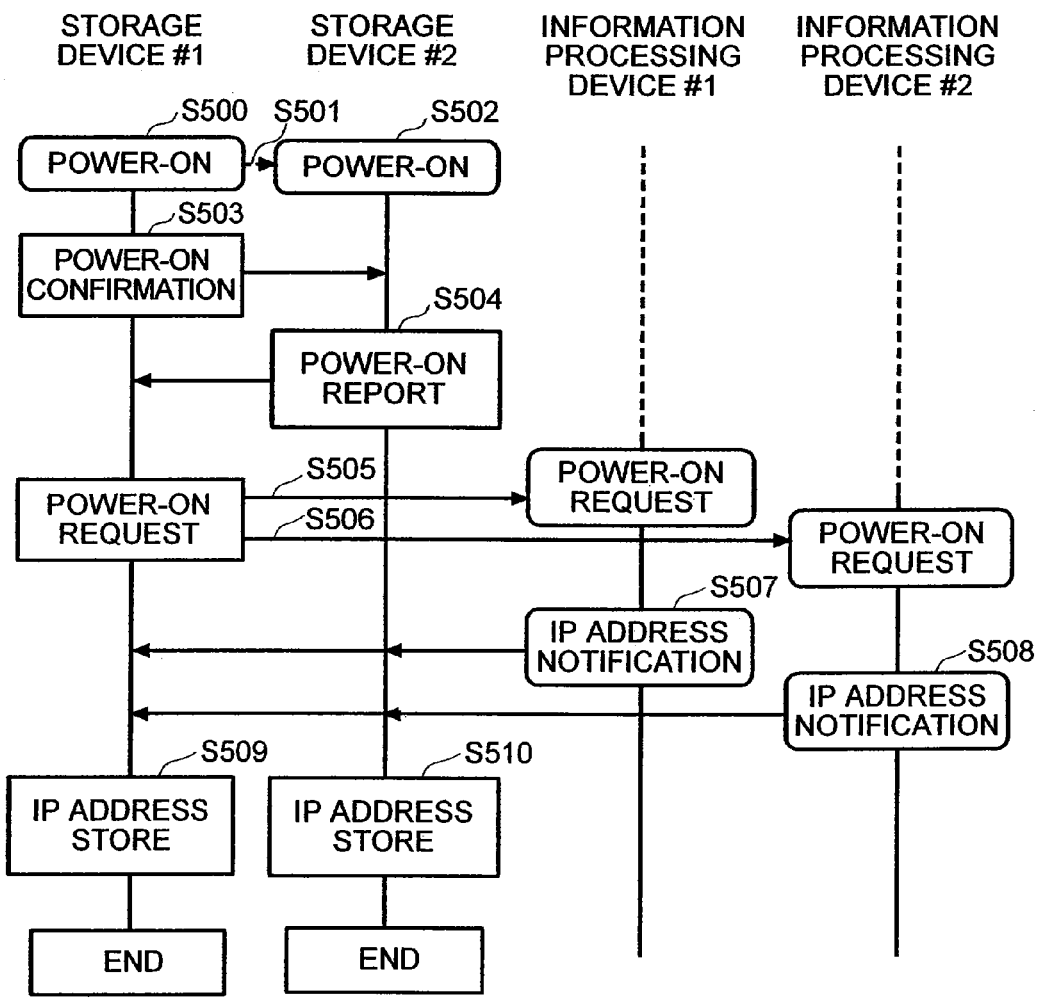
FIG. 5 is a flow chart illustrating a second system activation sequence process of the storage system.

FIG. 5 shows a flow chart explaining the system activation sequence processing of storage system 600 relating to another embodiment. In addition, since (S500) to (S504) in FIG. 5 carry out the same operations as (S400) to (S404) in FIG. 4, those explanations are omitted here.

The storage device #1 (100), when it receives notification that power was turned on from storage device #2 (100), transmits to SVP 250 the activation use special packet for turning on power (Power-On Request) for all information processing devices 200, broadcasting it through LAN 400 (S505, S506). In addition, in this embodiment, in order for SVP 250 to receive the power-on request from storage device 100, there is a slight current flowing through SVP 250.

When the receiving part 251 of each SVP 250 receives the activation use special packet from storage device #1 (100) through LAN 400, a determination is made whether the special packet was transmitted from storage device 100 and was registered in advance by an operator. The registration of storage device 100 can be carried out by an activity that an operator uses to control the management computer 800 and to set storage device 100 so that information processing device 200 can access the storage device.

If the activation use special packet is one that was transmitted from registered storage device 100, transmitting part 252 of SVP 250 transmits the power-on request to power supply unit 270 through power supply control line 280. Power supply unit 270, on receiving the power-on request, turns on the power, and supplies the power to each board and unit through power supply line 290. Once power is supplied, processor 210 activates the program that initiates the function for transmitting the data input and output request.

Processor 210 enters a state where it can transmit the data input and output request transmitted from information processing device 200, and notifies SVP 250 of that information. When detecting part 253 of SVP 250 receives this information, transmitting part 252 notifies storage devices #1, #2 (100) through SAN 300 of data containing an IP address, which is a network address given to information processing device (S507, S508).

When storage devices #1, #2 (100) receive data containing an IP address from transmitting part 252 of information processing device 200, they store the IP address in information processing device management table (S509, S510). In this way, it is a complicated operation a complicated operation is eliminated that an operator the management computer 800 to set and register in advance information processing device 200 which gives access permission to storage device 100 with respect to each storage device 100. In addition, the next time the storage device 100 transmits the power-on request and the power-stop request, the information processing for devices 200 has been eliminated and it is possible to prevent an increase of traffic in the network.

When storage device 100 registers the IP address and so on that was given to information processing device 200 in information processing device management table (S509, S510), the system activation sequence processing is completed.

Figure 6:
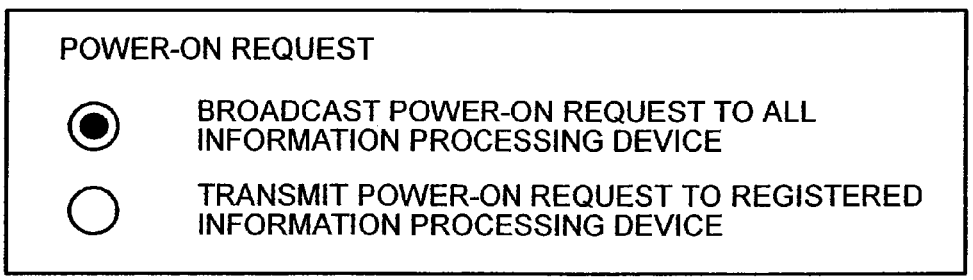
FIG. 6 is a diagram of an example of a screen, display on a management computer, for selecting a method of transmitting a power-on request to an information processing device.

In addition, the invention may be designed so that an operator can select which processing should be carried out from the above-described system activation sequence processing 1 and 2. This selection can be carried out by, for example, by having a display of management computer 800 on display a screen as shown in FIG. 6. As above, by making an arrangement to select "BROADCAST POWER-ON REQUEST TO ALL INFORMATION PROCESSING DEVICES" and "TRANSMIT POWER-ON REQUEST TO REGISTERED INFORMATION PROCESSING DEVICE", according to need, it is possible to have storage device 100 obtain an IP address of the information processing device 200 that can access storage device 100. It is also possible to prevent an increase of traffic in the network, which occurs when storage device 100 broadcasts the power-on request to all of the information processing devices 200.

<System Activation Sequence Processing 3>

Figure 7:
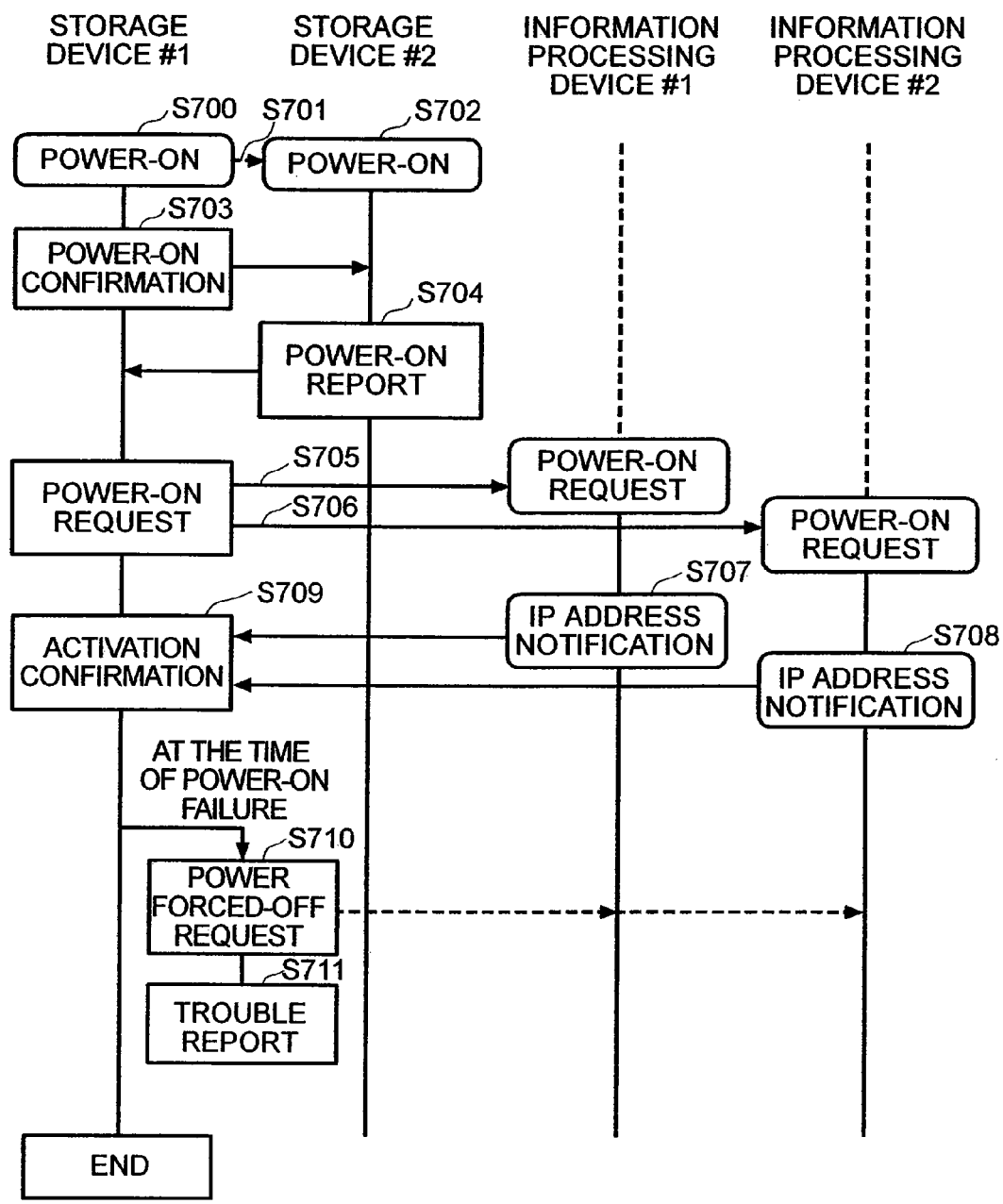
FIG. 7 is a flow chart illustrating a third system activation sequence process of the storage system.

FIG. 7 is a flow chart explaining the system activation sequence processing of storage system 600 relating to another embodiment. In addition, since (S700) to (S704) in FIG. 7 carry out the same operations as (S400) to (S404) in FIG. 4, that explanation will be omitted here.

Through the previously described activation sequence processing 2, the activation uses a special packet for having power turned on is transmitted to SVP 250 of information processing devices #1, #2 (200) to which IP addresses stored in the information processing device management table through LAN 400 (S705, S706) are addressed. In addition, in this embodiment, for SVP 250 to receive the power-on request from the storage device 100, there is a slight current is flowing through SVP 250.

When receiving part 251 of each SVP 250 receives the activation use special packet from storage #1 (100) through LAN 400, transmitting part 252 of SVP 250 transmits the power-on request to power supply unit 270 through power supply control line 280. Once the power-on request is received, power supply unit 270, turns on the power and supplies power to each board and unit through power supply line 290. With power supplied thereto, processor 210 activates a program that initiates the function for transmitting the data input and output request.

Processor 210 confirms it is in a state where it can receive the data input and output request transmitted from information processing device 200 and send that information to SVP 250. When detecting part 253 of SVP 250 receives the information, detecting part 253 sends data containing an IP address to storage device #1 (100) through SAN 300 (S707, S708).

Storage device #1 (100) receives the data containing the IP address from transmitting part 252 of information processing device 200 and stores the notification in the activation completion column of the information processing device management table. In addition, in this embodiment, after transmitting the activation use special packet to information processing devices #1, #2 (200), storage device #1 (100) is described as waiting for the data containing the IP address from information processing devices #1, #2 (200), but it may be designed so that, after transmission of the activation use special packet to information processing devices #1, #2(200), storage device #1 (100) queries information processing devices #1, #2 (200) periodically or at set intervals regarding whether the program that has the function for transmitting the data input and output request was activated.

Once storage device #1 (100) confirms receipt of the data containing the IP address from all of the information processing devices 200 to which the power-on request was transmitted (Activation Confirmation; S709), the storage device ends the system activation sequence processing.

If storage device #1 (100), after transmitting the activation use special packet, could not receive the data containing the IP address from SVP 250 of information processing device 200, even after a given period of time passed, the storage device then transmits to SVP 250 of information processing device 200 a special packet to cut off the power of information processing device 200 (S710). When receiving part 251 of SVP 250 of information processing device 200 receives the special packet for cutting off the power, transmitting part 252 of SVP 250 transmits the special packet cutting off the power (Power-off request) to power supply unit 270. When the request is received, power supply unit 270 carries out processing for cutting off the supply of power.

Alternatively, the invention may be designed so that in a case storage devices #1, #2 (100), after transmitting the activation use special packet, could not receive the data containing the IP address from information processing device 200 even after a given period of time, storage device #1 (100) can cut off a communication connection with information processing device 200. In a case where it has been determined that the power-on function of information processing device 200 has failed, the system may be designed so that storage device #1 (100) does not transmit the special packet to cut off power immediately, but transmits a reset use special packet to have information processing device 200 re-activated (Reset Request).

After transmitting the special packet for having power cut off to SVP 250 of information processing device 200 (S710), storage device #1 (100) reports to an information processing device 200 that is properly activated, user device 700, management computer 800, and so on, that there a glitch has occurred in information processing device 200 (S711). This report informs a user that a problem exists in information processing device 200.

===System Stop Sequence Processing===

Storage system 600 of this embodiment includes an information processing device 200, which has a power supply with a function for transmitting a data input and output request, and a storage device 100 connected to information processing device 200 in such a manner that the two devices communicate with each other and having a power supply that has a function for accepting the data input and output request transmitted from information processing device 200. In the storage system 600 of the embodiment, when storage device 100 accepts a power-stop instruction from an operator, a system stop sequence processing is initiated. An operation is carried out by this processing for transmitting the power-stop request to turn off the power supply of information processing device 200.

Through this processing system, because the power supply of information processing device 200 is stopped and then the power supply of the storage device 100 is stopped, it becomes possible to control the power supply of storage device 100 and the power supply of information processing device 200 in such a manner that they are interlocked with each other. As a result, it becomes possible to prevent destruction of data, mismatch of file systems, and the like, which occur due to making a mistake in the order of power-stop commands. Next, the system stop sequence processing for storage system 600 will be described.

Figure 8:
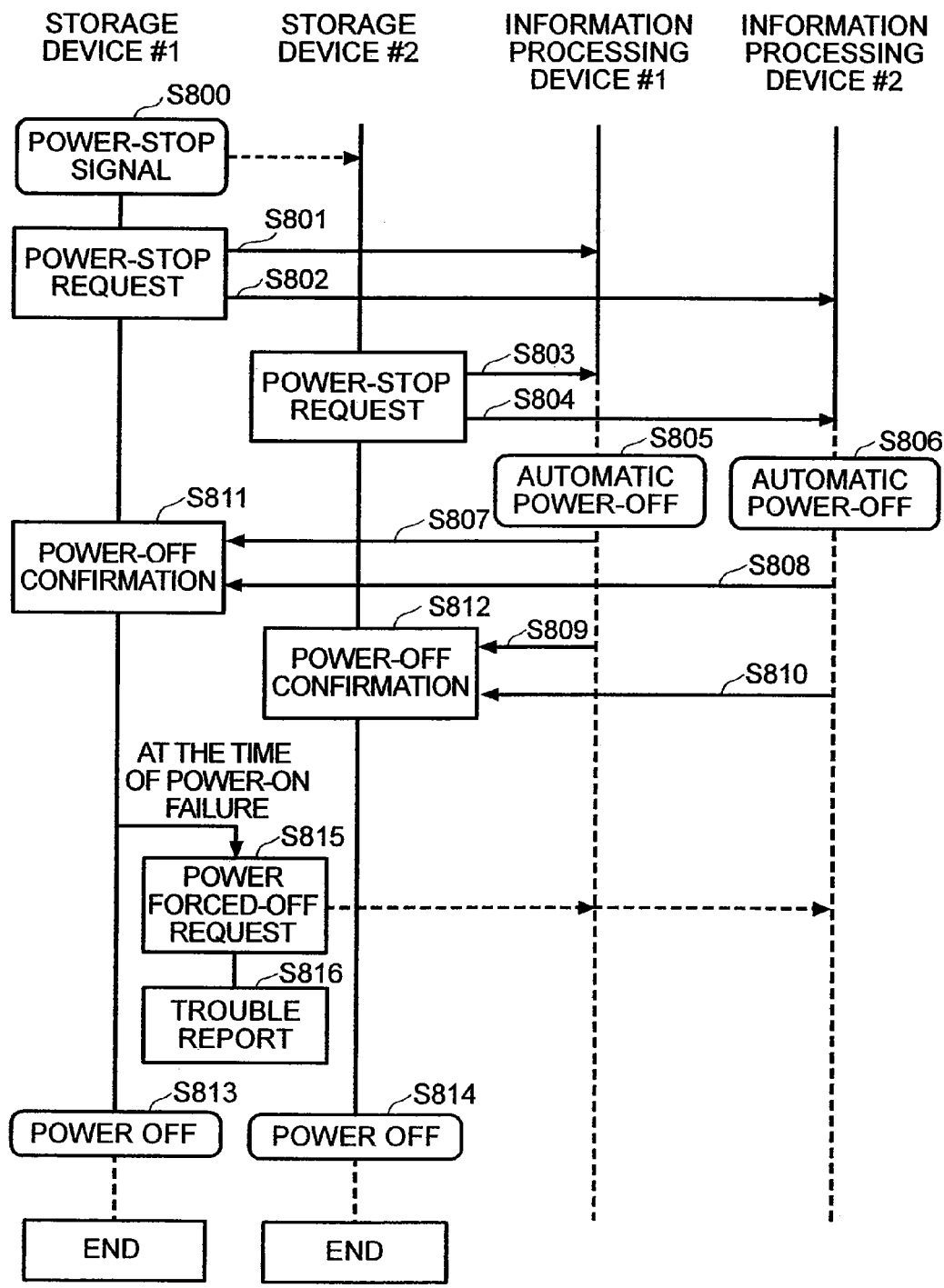
FIG. 8 is a flow chart illustrating a system stop sequence process.

FIG. 8 is a flow chart explaining the system stop sequence processing of storage system 600 relating to this embodiment. When storage device #1 (100) accepts a power-stop instruction of an operator, the system stop sequence processing of storage system 600 is initiated. When power supply unit 190 of storage device #1 (100) accepts the power-stop instruction of an operator, the power-stop request is transmitted to power supply unit 190 of storage device #2 (100) (S800). When power supply unit 190 of storage device #2 (100) receives the power-stop request, storage device #2 (100) also initiates system stop sequence processing. Alternatively, the invention may be designed so that the power-stop instruction is applied to all of the storage devices (which correspond to storage devices #1, #2 in this embodiment) 100 by an operator.

When the system stop sequence processing is initiated, storage device #1, #2 (100) transmits a stop use special packet (Power-Stop Request) to SVP 250 of information processing devices #1, #2 (200) through LAN 400. Information processing device 200, which transmits the power-stop request, may be an information processing device stored in the information processing device management table, or an information processing device registered in advance by an operator[0083] When receiving part 251 of SVP 250 receives the stop use special packet from storage devices #1, #2 (100) through LAN 400, SVP 250 confirms the stop use special packet and requests a shut-down instruction from processor 210. In this way, processor 110 carries out a set of processing steps for completing a program such as an operating system or an application running in information processing device 200 or the like.

Before completing the shut down of the operating system, or at the time of shutting down, processor 210 send a shut-down completion report to SVP 250. When SVP 250 receives this report, transmitting part 252 of SVP 250 transmits a power-stop request to power supply unit 270. Power supply unit 270 receives the power-stop request and cuts off power to information processing device 200 (S805, S806).

When detecting part 253 of SVP 250 detects that power to information processing device 200 has stopped, reports the power stoppage to storage devices #1, #2 (100) through LAN 400 (S807-S810). The report that power was stopped may be when the shut-down completion report from processor 210 was transmitted. The invention may also be designed so that after the storage devices #1, #2 (100) transmit the stop use special packet, they query information processing device 200, periodically or at predetermined intervals, about where the stop use special packet was transmitted and whether power was stopped.

When confirmation that power was stopped has been received from all of the information processing devices 200 to which the power-stop request was transmitted (S811, S812), storage devices #1, #2 (100), carry out processing for stopping power. More specifically, processor 110 carries out a set of processing steps to complete a program such as an operating system running in storage devices #1, #2 (100), and so on, or to complete processing for an application running in the storage devices #1, #2 (100). Then processor 110 cuts off power that power unit 190 of storage devices #1, #2 (100) supplies to each board and unit (S813, S814), and storage devices #1, #2 (100) complete the system stop sequence processing.

If storage devices #1, #2 (100) transmit the stop use special packet but cannot receive notification from SVP 250 of the information processing device 200 that power was stopped, even after a given period, storage device #1 (100) transmits the special packet for cutting off the power supply of information processing device 200 (Power-off request) to SVP 250 (S815). In this case, the invention may be designed so that storage device #1 (100) cuts off its communication connection with information processing device 200.

After transmitting the special packet for cutting off the power supply to SVP 250 of information processing device 200 (S815), storage device #1 (100), reports to user device 700, management computer 800, and so on, that a glitch has occurred in information processing device 200 (S816). This report informs a user that there some sort of problem exists in the information processing device.

As above, the embodiments were described, but the above-described embodiments are ones for facilitating understanding of the invention, and are not ones for interpreting the invention in a limited manner. The invention can be modified and improved without deviating from its keystone, and equivalents thereof are contained in the invention.

What is claimed is:

1. A method for controlling a storage system, the storage system including a storage device configured to store data in a logic volume having a logically defined physical storage area and the storage system including an information processing device configured to transmit a data I/O request to the storage device and having a first power supply which activates a function for transmitting the data I/O request, wherein the storage device is configured to communicate with the information processing device, the storage device having a second power supply which activates a function for accepting the data I/O request which is transmitted from the information processing device, and the method comprising transmitting from the storage device to the information processing device a power-on request for turning on the first power supply when the storage device is in a state in which the storage device can accept the data I/O request being transmitted from the information processing device; when the storage device accepts a stop instruction of the second power supply, the storage device transmitting a stop-power request for turning off the first power supply to the information processing device; and if the storage device did not receive a report that the first power supply was stopped from the information processing device after a given period time passed, the storage device transmitting a power-off request for turning off the first power supply to the information processing device.

2. A method according to claim 1 wherein the storage device is a first storage device of a plurality of storage devices, the method further comprising:
   connecting the storage devices to communicate with each other;
   from the first storage device transmitting a power-on request for turning on the second power supply to a second storage device, when the second power supply of the first storage device is turned on; and
   the first storage device receiving from the second storage device a notification that the second storage device can accept the data I/O request being transmitted from the information processing device.

3. A storage system including a storage device and an information processing device, the information processing device configured to transmit a data I/O request to the storage device and having a first power supply which activates a function for transmitting the data I/O request, the storage device configured to store data in a logic volume having a logically defined physical storage area, and the storage device connected to communicate with the information processing device, the storage device having a second power supply which activates a function for accepting the data I/O request which is transmitted from the information processing device, wherein:

the storage device is configured to transmit a power-on request for turning on the first power supply to the information processing device when the storage device is in a state in which the storage device can accept the data I/O request being transmitted from the information processing device;

when the first storage device accepts a stop instruction of the second power supply, the first storage device transmits a stop-power request for turning off the first power supply to the information processing device; and wherein if the storage device did not receive a report that the first power supply was stopped from the information processing device after a given period time passed, the storage device transmits a power-off request for turning off the first power supply to the information processing device.

4. A storage system according to claim 3 wherein the storage device is a first storage device of a plurality of storage devices, and wherein:

the storage devices are connected to communicate with each other;

the first storage device is configured to transmit a power-on request for turning on the second power supply to a second storage device, when the second power supply of the first storage device is turned on; and the first storage device is configured to receive from the second storage device a notification that the second storage device can accept the data I/O request being transmitted from the information processing device.

* * * * *